United States Patent [19]

Kaiser et al.

[11] Patent Number: 4,986,592
[45] Date of Patent: Jan. 22, 1991

[54] ANTI-GLARE DEVICE

[75] Inventors: Klaus P. Kaiser, Wermelskirchen; Lothar Viertel, Altforweiler, both of Fed. Rep. of Germany; Patrick Welter, Lachambre, France

[73] Assignee: Gebr. Happich GmbH, Fed. Rep. of Germany

[21] Appl. No.: 478,656

[22] Filed: Feb. 12, 1990

[30] Foreign Application Priority Data

Feb. 14, 1989 [DE] Fed. Rep. of Germany ....... 3904367

[51] Int. Cl.$^5$ .............................................. B60J 3/00
[52] U.S. Cl. ..................................... 296/97.8; 160/136
[58] Field of Search ............ 296/97.8; 160/136, 370.2, 160/176.1

[56] References Cited

U.S. PATENT DOCUMENTS

| 4,614,375 | 9/1986 | Miller et al. | 296/97.8 |
| 4,758,042 | 7/1988 | Liu | 296/97.8 |
| 4,824,160 | 4/1989 | Fleming | 296/97.8 |

FOREIGN PATENT DOCUMENTS

| 1140475 | 11/1962 | Fed. Rep. of Germany . |
| 1915554 | 10/1970 | Fed. Rep. of Germany . |
| 2401520 | 7/1975 | Fed. Rep. of Germany . |
| 3035618 | 4/1982 | Fed. Rep. of Germany . |

Primary Examiner—Robert R. Song
Attorney, Agent, or Firm—Ostrolenk, Faber, Gerb & Soffen

[57] ABSTRACT

An anti-glare device for motor vehicles including two profiled strips extending parallel and each having a respective pin receiving generally dovetail shaped groove extending along its length. A plurality of slats extend between the profiled strips. Each slat includes a respective pin at each opposite end for reception in the profiled strip grooves and the pins being pivotable in the grooves for pivoting all of the slats to respective use and non-use positions. The pins at the end of the slats are shaped to the grooves in the profiled strips, with one pin being on one surface of the slat and the other pin being on the opposite surface of the slat and the grooves being correspondingly oriented. A spacer is positioned in the groove between adjacent pins and the pins are detented on the spacers particularly into the non-use position. A blocking element at the end of the first and last slats keeps them in the grooves.

27 Claims, 4 Drawing Sheets

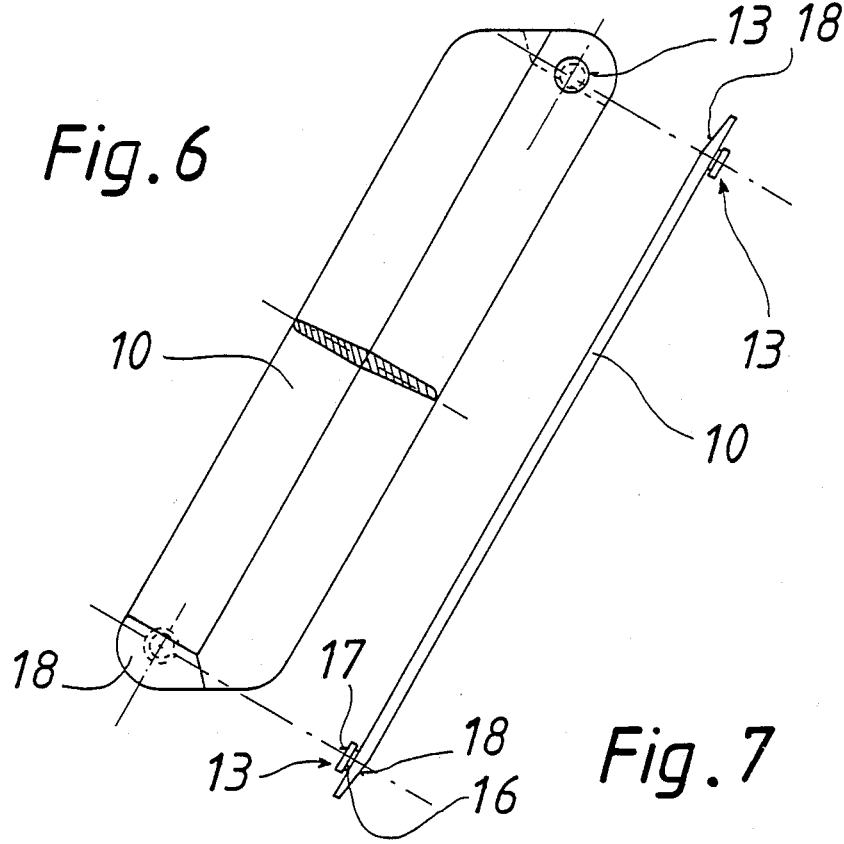
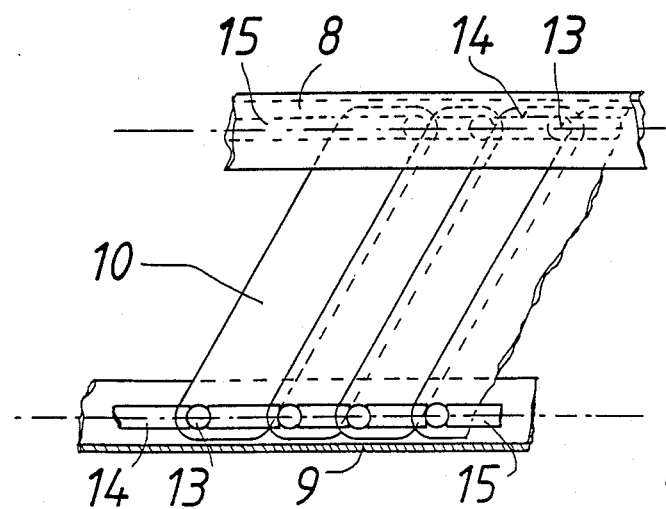

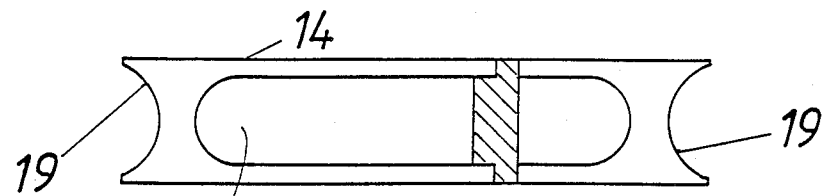
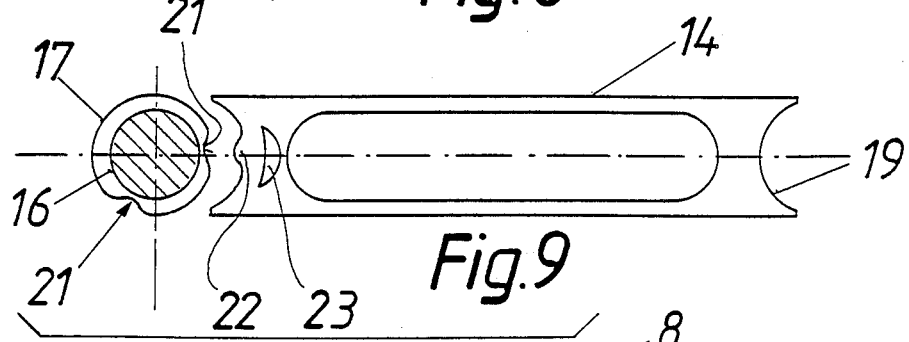
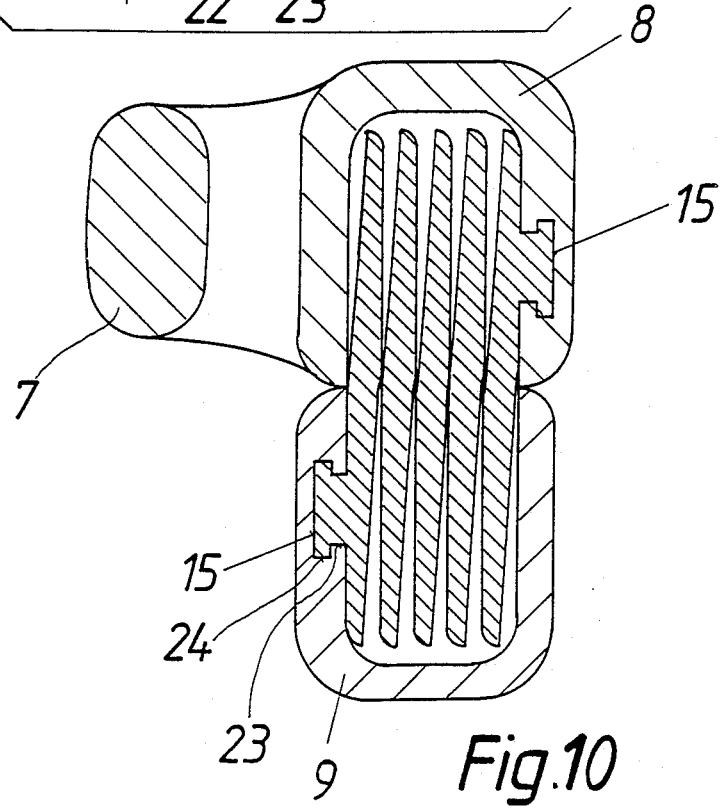

ANTI-GLARE DEVICE

BACKGROUND OF THE INVENTION

The present invention relates to an anti-glare device, particularly for motor vehicles, comprising two profiled strips which extend parallel to each other and comprising a plurality of slats which overlap each other and are arranged between the profiled strips. Each longitudinal end of each slat is pivotally connected to one of the profiled strips, and their corresponding points of articulation are arranged diagonally opposite each other.

An anti-glare device of this type is known from Federal Republic of Germany Laid Open Application AS 11 40 475.

SUMMARY OF THE INVENTION

The object of the present invention is to simplify and improve the construction of an anti-glare device of the aforementioned type.

According to the invention, each profiled strip has a lengthwise groove in it of approximately dovetail shape. Each slat bears on each longitudinal end a support pin which is adapted to the crosssectional opening of the respective groove in the strip. In each case, one support pin is arranged on the front side of each slat and one support pin is arranged on the rear side of each slat. Between the support pins of adjacent slats, a spacer, which is guided in the groove, rests against the support pin. The support pins of the first and last slats are secured against axial displacement by a blocking element in the groove.

The invention creates a comfort increasing, inexpensive, anti-glare device which can be attached subsequently in the vehicle and which can be assembled by mere insertion in grooves rather than by expensive riveting.

The profiled strips are preferably developed as rails of U-shaped cross-sectional profile and the open sides of the U-s face each other. In this connection, the depth of each groove of the profiled strips is at least equal to or slightly greater than half the width of the slats. This causes the anti-glare device to be of only small structural height, and when the anti-glare device is not in use, the slats lie protected between the profiled strips. The anti-glare device forms a packaging unit which, in particular, also can be stacked, which is ideal for storage and shipping purposes.

Furthermore the slats may be developed as plastic injection molded parts with their support pins formed integrally with them. Each pin has a narrower cylindrical neck piece and a wider cylindrical head piece. These measures enable the slats, together with the support pins, to be produced easily and economically and enables them to be adapted without special expense to different decorative colors through the use of differently colored plastics.

In a further development of the invention, each slat is developed in the form of a parallelogram. The end edges of the slats thereby assume a stop function which limits their path of swing. This is also true of another development of the invention wherein in the position of rest of the slats, their longitudinal edges extend parallel to the profiled strips and, in the completely swung out position of use of the slats (after a path of displacement of about 120°), their end edges extend parallel to the profiled strips.

In a particularly advantageous version of the invention, the thickness of the slats decreases from their longitudinal center toward both of their longitudinal edges. The thickness of the slats can in this case be continuously about 2 mm in the longitudinal center and about 1 mm at the longitudinal edges. This measure serves to save space, weight and material, and particularly favors the easy sliding of the slats over each other. This sliding can be further optimized by the free end regions of each of the slats having a flat on its broad sides facing away from the support pins.

In another feature of the invention, the slats can be stabilized by embedded fillers, particularly glass fibers for stability reasons, particularly also with respect to the lengthwise coefficient of thermal expansion which is to be reduced.

The spacers between pins are advantageously of rectangular cross-section and have recesses in the shape of circular segments at their ends. The shape of the recess is adapted to the radius of the supporting-pin head pieces. The spacers are developed over at least a part of their length with a cross-sectional profile which is adapted to the cross-section of opening of the grooves provided in the respective profiled strip. The spacers are preferably made of plastic injected moldings. The spacers may thus be pushed easily and simply into the grooves to then define the intended distance between the support pins of the slots from each other in a reliable manner.

In another feature of the invention, between one or more of the support pins and the respective spacers, detent means are provided in order to secure the slats at least in their position of non-use, and possibly also in different positions of use, against unintended swinging. The detent means may comprise at least one notch at the end of a head piece of a support pin and of a projection in a recess, having a circular-segment shape, of a spacer which can be engaged in the notch. It is advisable that the spacer then have an opening adjacent to the projection, which opening permits an elastic springing back of the projection.

The profiled strips may be comprised of extruded profiled sections of material, and particularly of light metal or plastic. In such case, where the profiled strips end, their undercut grooves are closed by end caps, or the like.

The profiled strips can preferably, however, also be developed as plastic injection moldings, to obtain the advantage that the end pieces can be formed in a single piece. It is then merely still necessary to close the grooves in the profiled strips, which can be formed by a slide in the injection mold, at their end by a plug, or the like, after the assembly of the slats and spacers.

As a further development of the invention a handle may be attached in one piece integrally on one profiled strip which produces a particularly suitable improvement in operation by moving that profiled strip by its handle.

The anti-glare device described above is fastened above a vehicle window, particularly a side window, in the body of the car. In an alternative arrangement, the anti-glare device is fastened on the window frame of a car door. The latter arrangement has the further advantage that the anti-glare device can remain in its position of use when the door of the car is opened.

Other objects and features of the invention are explained below with reference to the drawings.

BRIEF DESCRIPTION OF THE DRAWINGS

FIG. 5 is a partial view of the anti-glare device, shown partially in section.

FIG. 6 shows an individual slat of the device in top view.

FIG. 7 is a side view of the slat of FIG. 6.

FIG. 8 shows a spacer of the anti-glare device in top view.

FIG. 9 shows a modified spacer having a support pin of a slot shown on the left side thereof.

FIG. 10 is a vertical section through the anti-glare device shown in a position of non-use.

DESCRIPTION OF THE PREFERRED EMBODIMENTS

Figure 1:
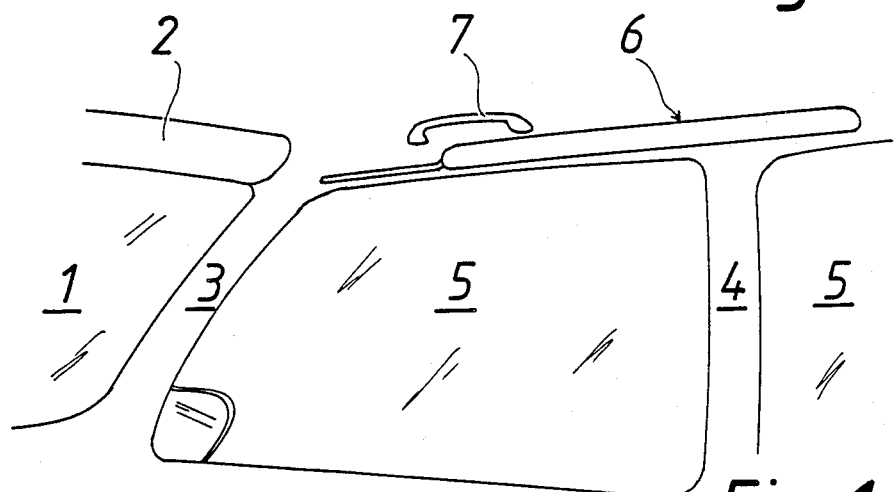
FIG. 1 shows the front right inner region of a car having an anti-glare device arranged above the front side window on the body of the car, and the device being shown in a position of non-use.

FIG. 1 shows the front right inside region of a car. The windshield 1 has a sun visor 2 arranged above it supported on the body of the car. There is an A column 3 and a B column 4. There are side windows 5, the new anti-glare device 6 above at least one of those windows, and a handle 7. The anti-glare device 6 is fastened above the top of the front side window to the body of the vehicle and is shown in its position of non-use in FIG. 1. From that position, it can be swung into the position of use shown in FIG. 2, when needed.

Figure 2:
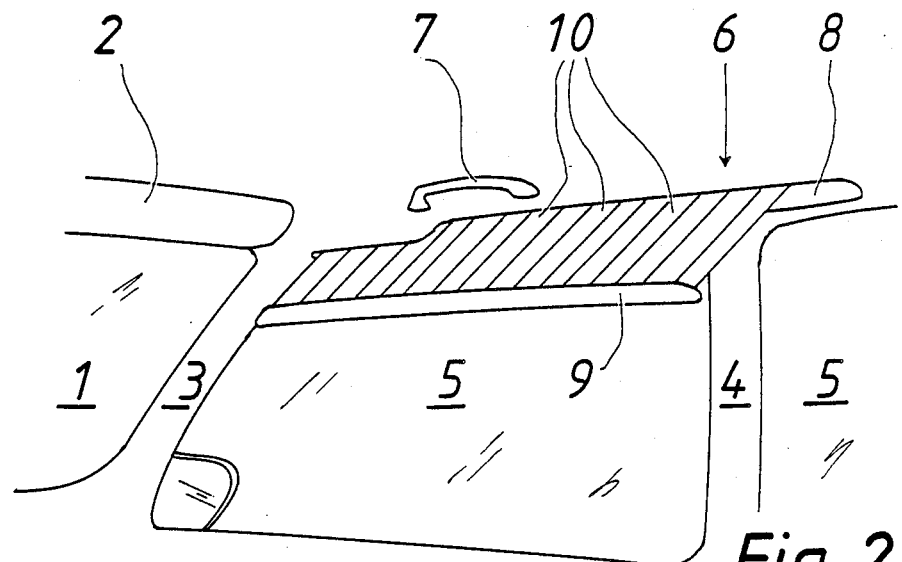
FIG. 2 is a view similar to that of FIG. 1, with the anti-glare device shown in a position of use.

FIG. 2 shows that the anti-glare device comprises an upper profiled strip 8 which also serves as the fastening rail which fastens the device into the car body, a lower profiled strip 9 which also serves as the actuating handle by which the strips are moved apart and together, and slats 10 mounted for swinging or pivoting between the profiled strips 8, 9 as the strips are moved apart and together. The arrangement in accordance with FIGS. 1 and 2 is placed and shaped such that the region of the upper edge of the front side window 5 can be covered in its entirety, i.e. from the A column to the B column.

Figure 4:
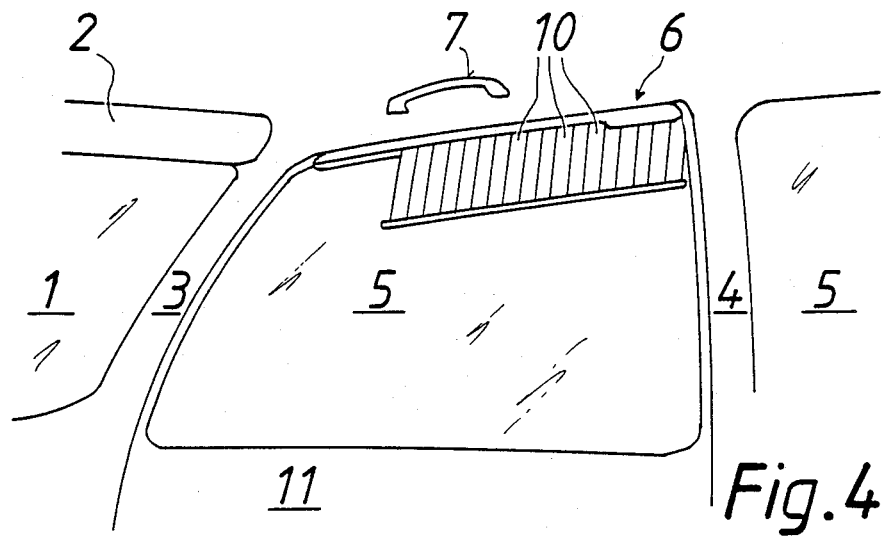
FIG. 4 is a view in accordance with FIG. 3, with the anti-glare device shown in a position of use.
Figure 3:
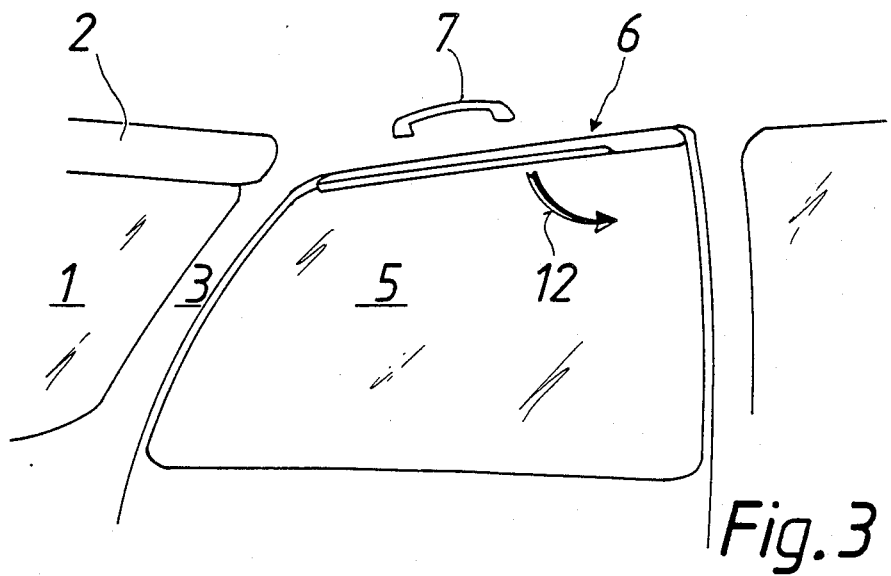
FIG. 3 is a view similar to that of FIG. 1, with an anti-glare device fastened on the door frame, and shown in a position of non-use.

In the embodiment shown in FIGS. 3 and 4, the anti-glare device 6 is not fastened to the body of the car but is instead attached to the upper horizontally extending arm of the front door, and possibly also to the rear door of the car. Contrary to the embodiment of FIGS. 1 and 2, the pivoting movement of the anti-glare device from its position of non-use into its position of use takes place from the front to the rear, in the direction of the arrow 12. In this case also, different from FIGS. 1 and 2, the entire width of the window is not covered.

FIG. 5 is a partial view of the anti-glare device 6 in which the upper profiled strip 8, the lower profiled strip 9, a plurality of slats 10 with support pins 13, and the spacers 14 which hold the support pins 13 of the slats 10 spaced from each other can be noted. Each profiled strip 8 and 9 has a continuous undercut groove 15 developed, for instance, in dovetail shape, which is adapted to receive the support pins 13 and the spacers 14.

In FIGS. 6 and 7, a slat 10 is shown in two views. The slat 10 is of generally parallelogram or rhombus shape with longer longitudinal edges and shorter end edges. In the position of non-use of the anti-glare device 6, its longitudinal edges extend parallel to the profiled strips 8 and 9 (see also FIG. 10). The shorter end edges extend parallel to the longitudinal axis of the profiled strips 8, 9 when the anti-glare device assumes its position of use. Because of the rhombus shape of the slats, the position of use of the slats is pivoted down about 120° from horizontal. Each slat 10 is developed as a plastic injection molding and has the support pins 13 developed integrally on its opposite longitudinal ends. One support pin is developed on the front side and the second support pin is developed on the rear side of the slat. Each support pin 13 has a cylindrical neck piece 16 and a cylindrical head piece 17 or collar. Each support pin 13 is adapted to the cross-section of the opening of the respective grooves 15 in the profiled strips 8, 9.

As shown particularly in FIGS. 6 and 10, the thickness of the slats decreases from their longitudinal center to their longitudinal edges (in one case toward the left and in one case toward the right). It can be noted from FIG. 7 that each of the free end regions of the slat 10 has a flat 18 on its wide sides facing in each case away from the respective support pin 13 at that end of the slat.

FIG. 8 shows a spacer 14 which has a rectangular contour, concavely shaped recesses 19 at each of its ends. In some regions, as shown, it has a cross-section which corresponds to the cross-section of opening of the profiled strip grooves 15. The radius of the recesses 19 corresponds to that of the head piece 17 of the support pins. The flat part of the spacer 14 therefore fits in the widening and the thick part (extension 20) fits in the narrowing of each undercut groove 15. The length of the spacer 14 between neighboring pins 13 is such that the individual slats 10 still overlap at their edges in their position of use, as shown in FIG. 5.

FIG. 9 shows a detent device for holding the new anti-glare device at least in its position of non-use. For this purpose, a head piece 17 of a support pin 13 has at least one notch 21 around its circumference into which a projection 22 which interrupts the concave course of the recess 19 can snap. Spring elasticity of the spacer is produced by the presence of a recess 23 which is adjacent to projection 22 and passes through a flat part of the spacer 14.

FIG. 10 shows a vertical section through the complete anti-glare device 6, which is shown here in its position of non-use. Each of the profiled strips 8, 9 can be developed as a rail of U-shaped cross-sectional profile. A groove 15 is present in each case in one arm of the profiled strips, on opposite sides. Each groove 15 has a narrower groove part 23 which faces the profile opening and an adjoining widened groove part 24. The groove part 23 corresponds in height and width to the neck piece 16 of support pin 13 and to the projection 20 of the spacer 14, while the groove part 24 corresponds to the head piece 17 and the flatter cross-sectional region of the spacer 14. Each of the slats has a respective width, and the depth of the grooves is equal to at least half the width of the slats. The support pins 13 and the spacers 14 can be pushed into the grooves 15 of the profiled strips 8, 9. During assembly, there is alternately inserted a support pin 13 and then a spacer 14. Each first and last assembly part is secured in each groove 15 against axial displacement, for instance, by a plug, an end cap or similar means.

FIG. 10 shows a further detail in which the profiled strip 8, which also serves as the fastening rail, is provided with a handle 7 formed on it by which the device is moved between its two positions.

All parts of the new anti-glare device, with the possible exception of the fastening elements, not shown, for attaching the device to the car consist of plastic, their manufacture being preferably effected by injection molding.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. An anti-glare device for use in motor vehicles, or the like, comprising:
   first and second profiled strips extending generally parallel to each other, the first strip being fastenable to an interior portion of the vehicle; each profiled strip having a respective groove therein extending along the profiled strip, with the first groove of the first strip facing in one direction and the second groove of the second strip facing in the opposite direction and generally toward the first groove;
   a plurality of slats arranged so that each slat at least partially overlaps the neighboring slat, each slat having opposite longitudinal ends which extend between the first and the second profiled strips, each slat having one side of the slat and an opposite side of the slat;
   pivot connection means at each longitudinal end of the slat and at the respective profiled strip at each slat end for enabling the slats to pivot with respect to the profiled strips as the second profiled strip is moved apart or toward the first strip; the pivot connection means of each slat comprises a support pin at each longitudinal end of the slat including a first support pin on the one side of the slat and a second support pin on the opposite side of the slat, the first support pin being disposed in the first groove of the first strip and the second support pin being disposed in the second groove of the second strip with the grooves and pins being so oriented as to enable the pins to be installed in the grooves, and the slats are pivotable about the pins in the respective grooves', and the pins of neighboring slats are so spaced apart along the respective grooves that the slats partially overlap as they are pivoted and in the use position.

2. The anti-glare device of claim 1, further comprising a respective spacer disposed in each of the grooves between adjacent support pins of neighboring slats and the spacers and the pins being guidable to set positions along the grooves.

3. The anti-glare device of claim 2, further comprising means at the ends of the grooves for blocking the support pins at each end of the grooves against axial displacement.

4. The anti-glare device of claim 2, wherein each of the grooves is of approximately dovetail shape and the pins and spacers are cooperatingly shaped to the shape of the respective grooves for being received and held in the grooves.

5. The anti-glare device of claim 4, wherein each of the slats is in the form of a plastic injection molding having the respective support pins developed integrally thereon;
   each pin having a cylindrical neck piece and a larger cylindrical head piece outward from the slat from the neck piece and shaped for being received and held in the respective approximately dovetail shaped groove.

6. The anti-glare device of claim 1, wherein each of the profiled strips is in the form of a respective rail of generally U-shaped cross-sectional profile and each U having an open side which faces toward and is opposite the open side of the other U.

7. The anti-glare device of claim 6, wherein the groove in the profiled strip has a respective depth, each of the slats has a respective width and the depth of the groove is at least equal to half the width of the slats.

8. The anti-glare device of claim 1, wherein each of the slats is in the form of a plastic injection molding having the respective support pins developed integrally thereon.

9. The anti-glare device of claim 1, wherein each slat is generally in the shape of a parallelogram having short edges which are at the respective profiled strips and longitudinal edges extending between the profiled strips.

10. The anti-glare device of claim 9, wherein the slats may be articulated between a non-use and a use position with respect to the profiled strips, and that in the position of non-use, the longitudinal edges of the slats are oriented generally parallel to the profiled strips and in the swung out position of use, the end edges extend generally parallel to the profiled strips.

11. The anti-glare device of claim 10, wherein the parallelogram shaped slats are so oriented and their respective longitudinal edges and end edges are so angled with respect to each other that the completely swung out position includes a path of swing of about 120° until the end edges of the slats extend parallel to the profiled strips.

12. The anti-glare device of claim 10, wherein the slats have a thickness dimension that decreases from their longitudinal center to their longitudinal edges.

13. The anti-glare device of claim 1, wherein the slats have a thickness dimension that decreases from their longitudinal center to their longitudinal edges.

14. The anti-glare device of claim 13, wherein the thickness of the slats comprises about 2 mm in the longitudinal center and about 1 mm at the longitudinal edges.

15. The anti-glare device of claim 1, wherein toward the longitudinal ends of the slats, the slats have free end regions, and the slats have a respective side at the free end region which is opposite the side on which the respective support pin at that end region is formed, an inclined flat being defined on that opposite side of the slat away from the support pin and at the respective end region at which the respective support pin is defined.

16. The anti-glare device of claim 1, further comprising each of the slats being stabilized by embedded fillers.

17. The anti-glare device of claim 2, wherein each of the spacers has a generally rectangular contour adapted for fitting in the respective groove and the spacer being fitted in the groove; each spacer having respective opposite ends and having a respective recess defined in each opposite end which is adapted to the shape of the respective support pin located at that end of the spacer;

over at least a part of its length, each spacer having a cross-sectional profile adapted to the cross-section of the opening of the groove in the profiled strip for holding the space in the groove.

18. The anti-glare device of claim 17, wherein each of the spacers is in the form of a plastic injection molding.

19. The anti-glare device of claim 17, further comprising detent means provided between at least one of the support pins and the respective end of the spacer adjacent that support pin for detent holding the respective support pin and thereby the respective slat and the connected profiled strip against unintended swinging from at least the position of non-use until the detent means is overcome.

20. The anti-glare device of claim 19, wherein the detent means comprises a notch on the circumference of the support pin and comprises a projection engageable in the notch and located in the respective end of the spacer and projecting toward the notch, wherein the end of the spacer further has a generally circular shaped segment in which the pin is received and in which the projection is defined.

21. The anti-glare device of claim 20, further comprising means for providing a springiness to the projection on the spacer and comprising an opening defined in the spacer behind the projection for permitting elastic springing back of the projection toward the notch and permitting the projection to elastically move out of the notch in the support pin, all as the support pin is rotated with respect to the recess.

22. The anti-glare device of claim 1, wherein the profiled strips are comprised of extruded material.

23. The anti-glare device of claim 1, wherein the profiled strips are plastic injection moldings.

24. The anti-glare device of claim 23, further comprising a handle which is of one piece with the second profiled strip, the handle being engageable for moving the second profiled strip to thereby pivot the slats.

25. The anti-glare device of claim 1, including means fastening the anti-glare device to a car body above a car window.

26. The anti-glare device of claim 1, further comprising means fastening the anti-glare device to the window frame of a car door.

27. The anti-glare device of claim 21, further comprising a handle connected with the second strip and the handle being engageable for moving the second strip to thereby pivot the slats.

* * * * *